(12) United States Patent
Chen et al.

(10) Patent No.: US 11,467,027 B2
(45) Date of Patent: Oct. 11, 2022

(54) VIBRATION SENSOR FOR OBTAINING SIGNALS WITH HIGH SIGNAL-TO-NOISE RATIO

(71) Applicant: MERRY ELECTRONICS CO., LTD., Taichung (TW)

(72) Inventors: Jen-Yi Chen, Taichung (TW);
Chao-Sen Chang, Taichung (TW);
Yueh-Kang Lee, Taichung (TW)

(73) Assignee: MERRY ELECTRONICS CO., LTD., Taichung (TW)

( * ) Notice: Subject to any disclaimer, the term of this patent is extended or adjusted under 35 U.S.C. 154(b) by 74 days.

(21) Appl. No.: 17/022,046

(22) Filed: Sep. 15, 2020

(65) Prior Publication Data

US 2021/0302225 A1   Sep. 30, 2021

Related U.S. Application Data

(60) Provisional application No. 62/994,292, filed on Mar. 25, 2020.

(51) Int. Cl.
*G01H 11/06*   (2006.01)
*H04R 19/04*   (2006.01)
*H04R 31/00*   (2006.01)

(52) U.S. Cl.
CPC .............. *G01H 11/06* (2013.01); *H04R 19/04* (2013.01); *H04R 31/003* (2013.01)

(58) Field of Classification Search
CPC ........ G01H 11/06; G01H 11/08; G01H 17/00; H04R 19/04; H04R 31/003; H04R 1/04; H04R 1/2876; H04R 19/005; H04R 2201/003; H04R 3/00; H04R 31/00; B81B 2201/0257; B81B 2203/0127; B81B 2203/0315; B81B 2203/04; B81B 2207/012; B81C 1/0023

See application file for complete search history.

(56) References Cited

U.S. PATENT DOCUMENTS

| 2011/0272769 | A1* | 11/2011 | Song | H04R 19/005 |
| | | | | 438/51 |
| 2016/0277844 | A1* | 9/2016 | Kopetz | H04R 19/005 |
| 2019/0058956 | A1* | 2/2019 | Zou | H04R 19/04 |
| 2020/0255284 | A1* | 8/2020 | Kueffner | H04R 1/04 |

FOREIGN PATENT DOCUMENTS

| CN | 209314103 U | * | 8/2019 |
| CN | 209526834 U | * | 10/2019 |
| CN | 209526836 U | * | 10/2019 |
| CN | 209526837 U | * | 10/2019 |
| CN | 209526861 U | * | 10/2019 |
| CN | 209526879 U | * | 10/2019 |

(Continued)

*Primary Examiner* — David L Singer
(74) *Attorney, Agent, or Firm* — CKC & Partners Co., LLC

(57) ABSTRACT

A vibration sensor is designed to have a pressure-enhancing member, a pressure sensing device and first, second, third chambers. A first through hole is designed to enable the first chamber to be vented to the third chamber such that the first chamber is combined with the third chamber to obtain a communicable air volume. When the pressure-enhancing member is moved to squeeze the air in the second chamber, a sensitivity of the pressure sensing device will be greatly improved.

15 Claims, 3 Drawing Sheets

(56) References Cited

FOREIGN PATENT DOCUMENTS

| | | | | | |
|---|---|---|---|---|---|
| CN | 209526886 | U | * | 10/2019 | |
| CN | 209659621 | U | * | 11/2019 | |
| CN | 111131988 | A | * | 5/2020 | ............. G01H 11/06 |
| CN | 210513399 | U | * | 5/2020 | |
| CN | 210513400 | U | * | 5/2020 | |
| CN | 210641062 | U | * | 5/2020 | |
| CN | 210641073 | U | * | 5/2020 | |
| CN | 110972045 | B | * | 11/2021 | ............. G01H 17/00 |
| DE | 102007008518 | A1 | * | 8/2008 | ........... B81B 7/0064 |

* cited by examiner

VIBRATION SENSOR FOR OBTAINING SIGNALS WITH HIGH SIGNAL-TO-NOISE RATIO

CROSS-REFERENCE TO RELATED APPLICATION

This application claims priority to Provisional Application Ser. No. 62/994,292, filed Mar. 25, 2020 which is herein incorporated by reference in its entirety.

BACKGROUND

Field of Invention

The present disclosure relates to a sensor, and more particularly, to a vibration sensor.

Description of Related Art

At present, both handheld electronic devices and wearable electronic devices require functions provided by vibration sensors such that the performance requirements for vibration sensors are becoming higher. Therefore, various suppliers are actively seeking solutions for vibration sensors with high signal-to-noise ratio.

SUMMARY

In one or more embodiments, a vibration sensor includes a circuit board, a pressure sensing device and a metal housing. The circuit board has a concave recess. The pressure sensing device is located on the circuit board and defines a first chamber along with the concave recess of the circuit board. The pressure sensing device includes a support board, a sensor and a pressure-enhancing member. The pressure-enhancing member includes a diaphragm and a mass. The support board, the sensor and the diaphragm of the pressure-enhancing member collectively define a second chamber. The metal housing is located on the circuit board and defines a third chamber along with the circuit board, wherein the circuit board has a sidewall which defines the concave recess and has a first through hole, and the first through hole allows the first chamber venting to the third chamber.

In one or more embodiments, a vibration sensor includes a circuit board, a pressure sensing device and a metal housing. The circuit board has a concave recess. The pressure sensing device is located on the circuit board and defines a first chamber along with the concave recess of the circuit board. The pressure sensing device includes a support board, a sensor and a pressure-enhancing member. The pressure-enhancing member includes a diaphragm and a mass. The support board, the sensor and the diaphragm of the pressure-enhancing member collectively define a second chamber. The metal housing is located on the diaphragm of the pressure-enhancing member and defines a third chamber along with the circuit board, wherein the circuit board has a sidewall which defines the concave recess and has a first through hole, and the first through hole allows the first chamber venting to the third chamber.

In one or more embodiments, the diaphragm covers the concave recess of the circuit board, and the diaphragm and the support board share substantially the same area.

In one or more embodiments, the support board covers the concave recess of the circuit board, and the diaphragm has an area smaller than that of the support board.

In one or more embodiments, the first, second and third chambers are all located between the metal housing and the circuit board, and the first chamber has an air-containing volume smaller than that of the third chamber.

In one or more embodiments, the support board has a second through hole aligned with the sensor.

In one or more embodiments, the first through hole has a bent cross-section.

In one or more embodiments, the diaphragm is located on the sidewall and covers the concave recess of the circuit board.

In one or more embodiments, the metal housing has a bottom in contact with the diaphragm, and the diaphragm has an area greater than that of the support board.

In one or more embodiments, the first through hole further goes through the diaphragm.

In sum, the vibration sensor disclosed herein includes a circuit board, a pressure-enhancing member, a pressure sensing device, and a metal housing to define the first, second, and third chambers. The metal housing covers the pressure-enhancing member and the pressure sensing device. Under the shielding of the metal housing, the pressure sensing device is more effective against electromagnetic interference (EMI). The circuit board has a sidewall to define a concave recess and the sidewall has a first through hole as a vent between the first chamber and the third chamber. The first chamber is combined with the third chamber to obtain a communicable air volume. When the pressure-enhancing member moves to squeeze the air in the second chamber, the sensitivity of the pressure sensing device will be greatly improved, and the vibration sensor can obtain a signal with a higher signal-to-noise ratio. Furthermore, an air-containing volume of the first chamber is smaller than that of the third chamber, which helps to increase air damping below the diaphragm, thereby making a smooth frequency response of the diaphragm.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
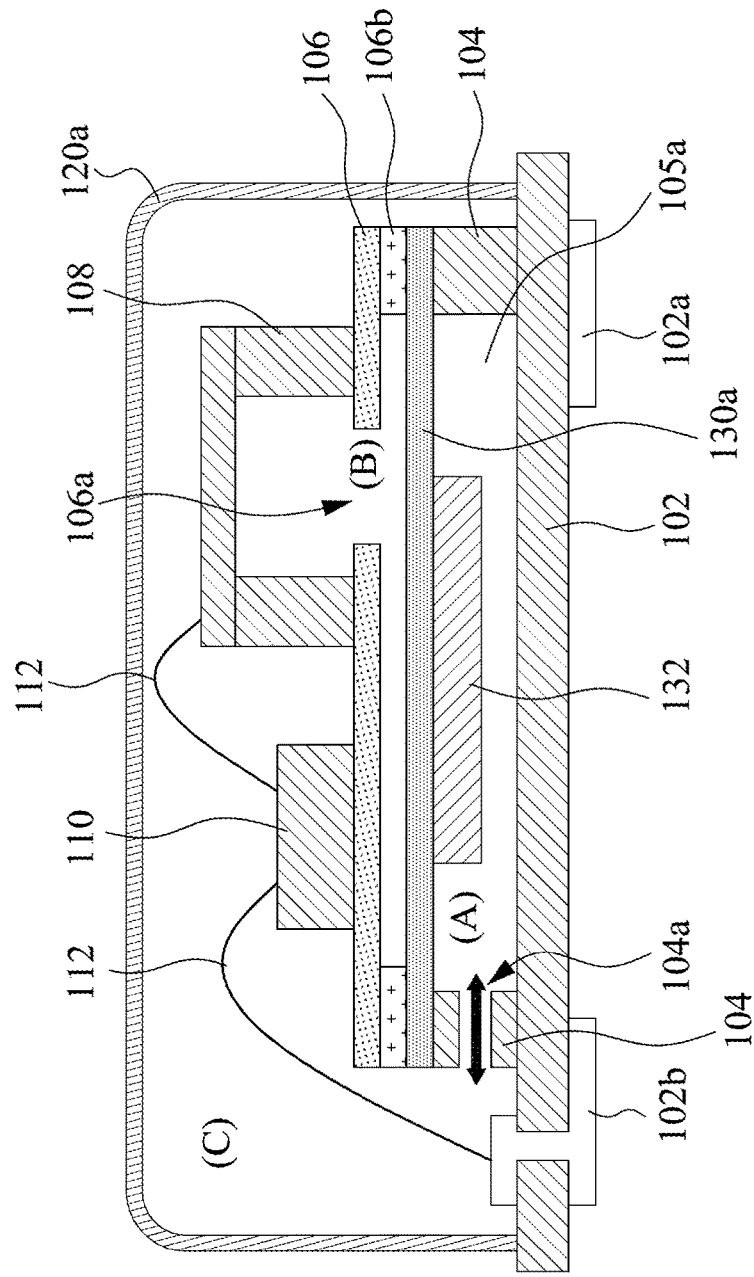
FIG. 1 illustrates a cross-sectional view of a vibration sensor according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Reference is made to FIG. 1, which illustrates a cross-sectional view of a vibration sensor according to one embodiment of the present disclosure. A vibration sensor 100a includes a circuit board 102, a metal housing 120a, and a pressure sensing device. The circuit board 102 has a concave recess 105a. The pressure sensing device is set on the concave recess 105a of the circuit board 102 to jointly define a first chamber (A). The pressure sensing device includes at least a support board 106, a sensor 108, and a pressure-enhancing member. The pressure-enhancing member includes at least a diaphragm 130a and a mass 132 fixed on the diaphragm 130a, wherein the support board 106, the sensor 108 and the diaphragm 103a of the pressure-enhancing member jointly define a second chamber (B). The mass 132 is located in the first chamber (A).

The circuit board 102 also includes a sidewall 104 located on its periphery. The diaphragm 130a is installed on the sidewall 104. The circuit board 102 and its sidewall 104 jointly define the concave recess 105a.

The support board 106 also has a surrounding convex portion 106b abutting against the diaphragm 130a. The sensor 108 and the signal processing chip 110 are electrically connected to the circuit board 102 through metal wires 112, and the circuit board 102 is electrically connected to external components through its electrodes (102a, 102b).

The metal housing 120a is located on the circuit board 102 and defines a third chamber (C) together with the circuit board 102. The metal housing 120a covers the pressure-enhancing member and the pressure sensing device. Under the shielding of the metal housing 120a, the pressure sensing device is more effective against electromagnetic interference (EMI). The first chamber (A), the second chamber (B) and the third chamber (C) are all formed between the metal housing 120a and the circuit board 102. The air-containing volume of the first chamber (A) is smaller than that of the third chamber (C). This design helps to increase air damping under the diaphragm 130a, thereby making a smooth frequency response of the diaphragm 130a, which meets the characteristics required by the vibration sensor.

In this embodiment, a bottom end of the metal housing 120a abuts the circuit board 102, the diaphragm 130a covers the concave recess 105a of the circuit board 102, and an area of the diaphragm 130a is substantially equal to an area of the support board 106, but not being limited thereto.

In this embodiment, the sidewall 104 may optionally have a first through hole 104a such that the first chamber (A) could vent to the third chamber (C) via the first through hole 104a, but not being limited thereto. In addition, the support board 106 also has a second through hole 106a aligned with the sensor 108.

Figure 2:
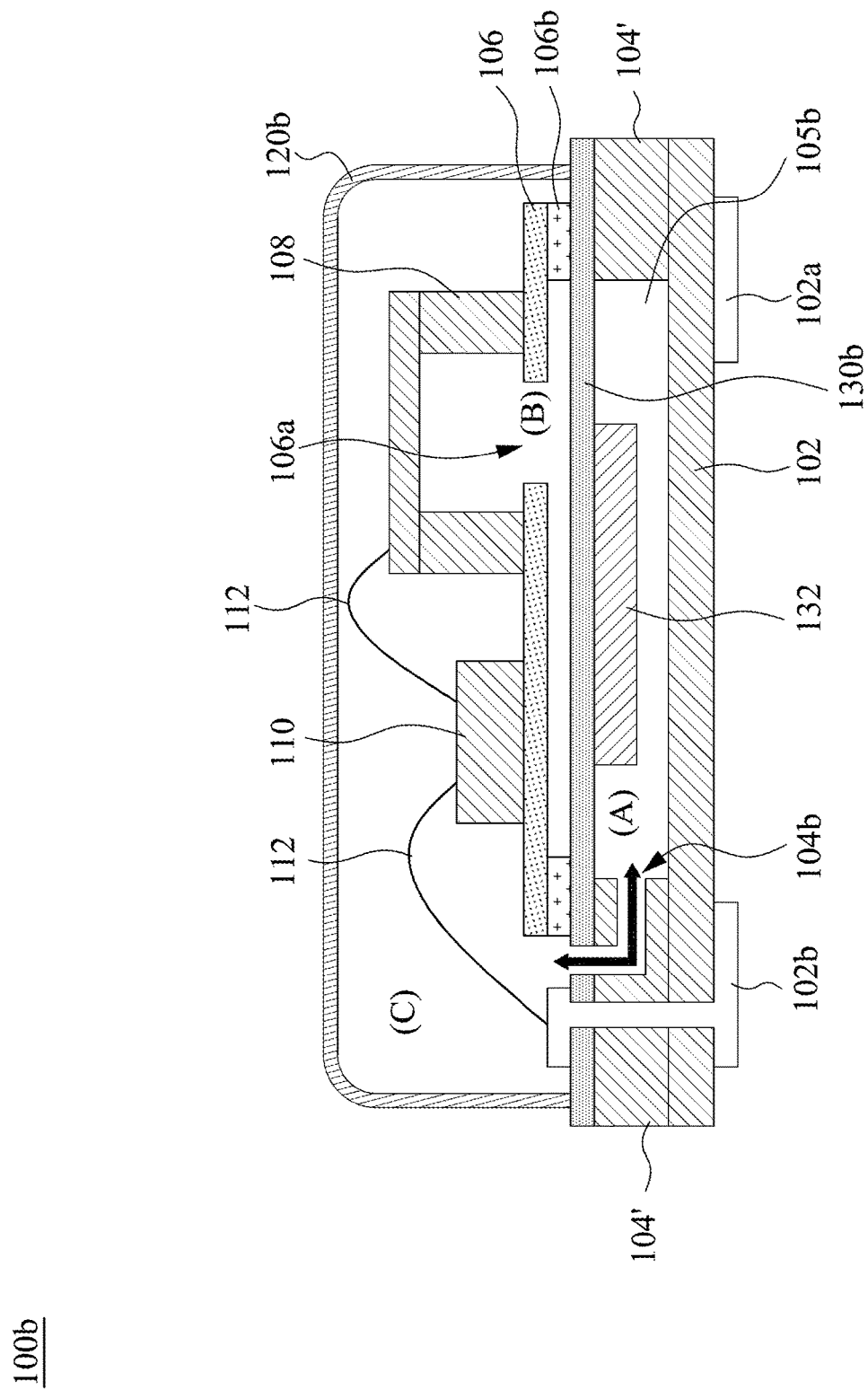
FIG. 2 illustrates a cross-sectional view of a vibration sensor according to another embodiment of the present disclosure.

Reference is made to FIG. 2, which illustrates a cross-sectional view of a vibration sensor according to another embodiment of the present disclosure. A vibration sensor 100b includes a circuit board 102, a metal housing 120b, and a pressure sensing device. The circuit board 102 has a concave recess 105b. The pressure sensing device is located over the concave recess 105b of the circuit board 102 to jointly define a first chamber (A). The pressure sensing device includes at least a support board 106, a sensor 108, and a pressure-enhancing member. The pressure-enhancing member includes at least a diaphragm 130b and a mass 132 fixed on the diaphragm 130b, wherein the support board 106, the sensor 108 and the diaphragm 103b of the pressure-enhancing member jointly define a second chamber (B). The mass 132 is located in the first chamber (A).

The circuit board 102 also includes a sidewall 104' on its periphery. The diaphragm 130b is secured to the sidewall 104'. The circuit board 102 and its sidewall 104' jointly define a concave recess 105b.

The support board 106 also has a surrounding convex portion 106b abutting against a top surface of the diaphragm 130b. The sensor 108 and the signal processing chip 110 are electrically connected to the circuit board 102 through metal wires 112, and the circuit board 102 is electrically connected to external components through its electrodes (102a, 102b).

The metal housing 120b is located on the diaphragm 130b, and defines a third chamber (C) together with the diaphragm 130b, wherein the metal housing 120b covers the pressure-enhancing member and the pressure sensing device such that the pressure-enhancing member and pressure sensing device are all located in the third chamber (C). Under the shielding of the metal housing 120b, the pressure sensing device is more effective against electromagnetic interference (EMI). Further, the first chamber (A), the second chamber (B) and the third chamber (C) are all formed between the metal housing 120b and the circuit board 102, and an air-containing volume of the first chamber (A) is smaller than that of the third chamber (C). This design helps increase air damping under the diaphragm 130b, thereby making a smooth frequency response of the diaphragm 130b.

In this embodiment, an area of the diaphragm 130b is substantially equal to an area of the circuit board 102, but greater than an area of the support board 106, and the diaphragm 130b covers the concave recess 105b of the circuit board 102 such that a bottom end of the metal housing 120b abuts the diaphragm 130b, but not being limited thereto.

In this embodiment, the first chamber (A) could vent to the third chamber (C) via the first through hole 104b. The first through hole 104b passes through the sidewall 104' and further passes through the diaphragm 130b. The cross-section of the first through hole 104b has a bent angle (for example, the L-shaped bent cross-section in the figure). In addition, the support board 106 also has a second through hole 106a aligned with the sensor 108.

Figure 3:
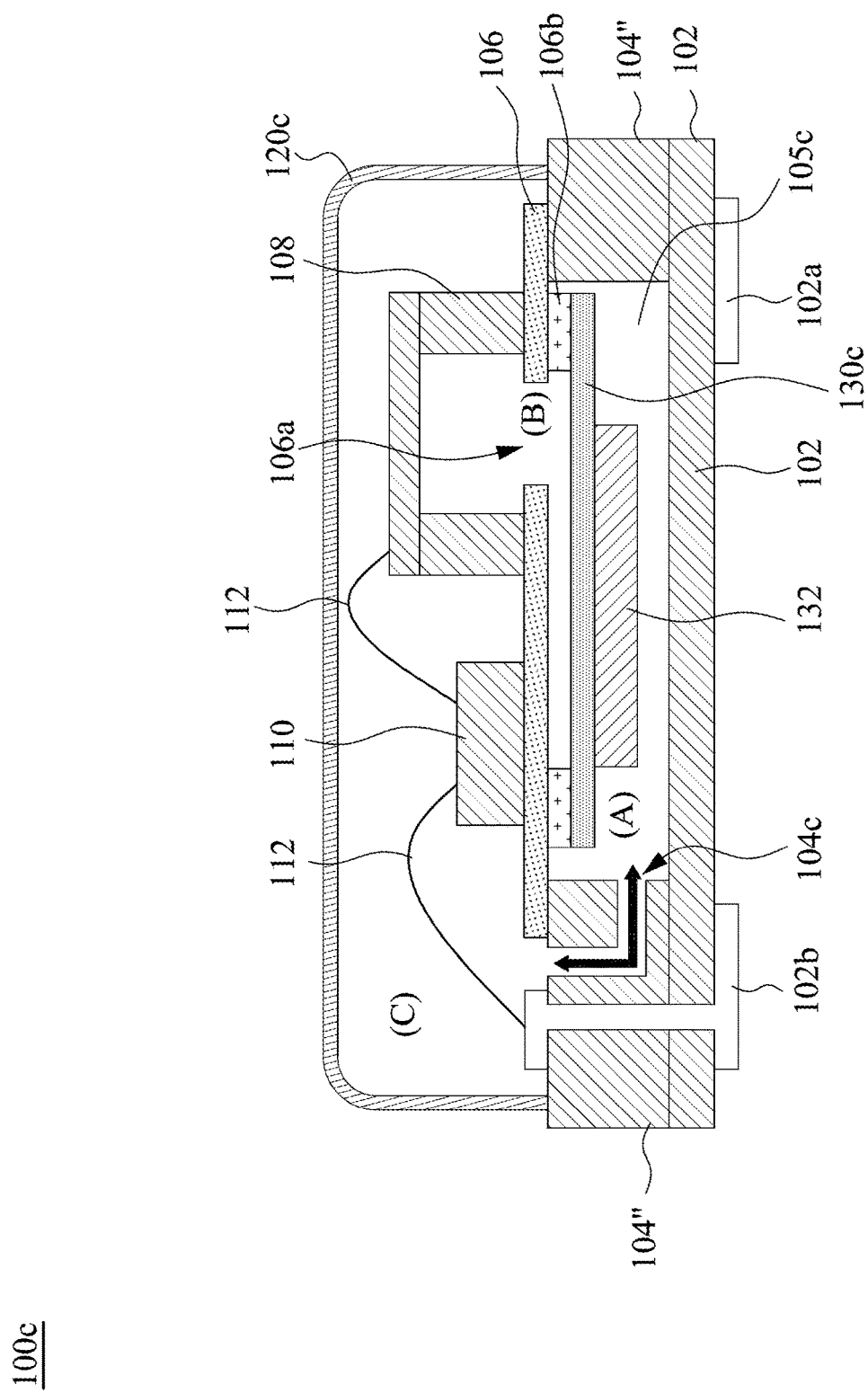
FIG. 3 illustrates a cross-sectional view of a vibration sensor according to still another embodiment of the present disclosure.

Reference is made to FIG. 3, which illustrates a cross-sectional view of a vibration sensor according to still another embodiment of the present disclosure. A vibration sensor 100c includes a circuit board 102, a metal housing 120c, and a pressure sensing device. The circuit board 102 has a concave recess 105c. The pressure sensing device is located over the concave recess 105c of the circuit board 102 to jointly define a first chamber (A). The pressure sensing device includes at least a support board 106, a sensor 108, and a pressure-enhancing member. The pressure-enhancing member includes at least a diaphragm 130c and a mass 132 fixed to the diaphragm 130c. The support board 106, the sensor 108, and the diaphragm 103c of the pressure-enhancing member jointly define a second chamber (B). The mass 132 is located in the first chamber (A).

The circuit board 102 further includes a sidewall 104" on its periphery, and the circuit board 102 and the sidewall 104" jointly define the concave recess 105c. A bottom end of the metal housing 120c abuts a top surface of the sidewall 104".

The support board 106 also has a surrounding convex portion 106b to which the diaphragm 130c is attached. The sensor 108 and the signal processing chip 110 are electrically connected to the circuit board 102 through metal wires 112, and the circuit board 102 is electrically connected to external components through its electrodes (102a, 102b). In this embodiment, an area of the diaphragm 130c is smaller than an area of the support board 106, but not being limited thereto.

The metal housing 120c is mounted on the sidewall 104" of the circuit board 102 and defines a third chamber (C) together with the circuit board 102. The metal housing 120c covers the pressure-enhancing member and the pressure sensing device. Under the shielding of the metal housing 120b, the pressure sensing device has better EMI resistance. Furthermore, the first chamber (A), the second chamber (B) and the third chamber (C) are all formed between the metal housing 120a and the circuit board 102, and an air-containing volume of the first chamber (A) is smaller than that of the third chamber (C). This design helps increase air damping under the diaphragm 130c, thereby making a smooth frequency response of the diaphragm 130c to meet with the characteristics required by the vibration sensor.

In this embodiment, the sidewall 104" may optionally have a first through hole 104c, so that the first chamber (A) could vent to the third chamber (C) via the first through hole 104c, but not limited thereto. The cross-section of the first through hole 104c has a bent angle (for example, the L-shaped bent cross-section in the figure). In addition, the support board 106 also has a second through hole 106a aligned with the sensor 108.

When the external vibration occurs, the pressure-enhancing member in the previous embodiments generates associated vibration, and the pressure sensing device is used to sense the pressure change caused by the vibration of the pressure-enhancing member. In the previous embodiments, the sensor 108 is a microphone device, and the signal processing chip 110 is used to receive and process the signals measured by the microphone device.

In the previous embodiment, the first through hole (104a-c) is designed such that the first chamber (A) could vent to the third chamber (C), and the first chamber is combined with the third chamber to obtain a communicable air volume. When the pressure-enhancing member moves to squeeze the air in the second chamber, the sensitivity of the pressure sensing device will be greatly improved, and the vibration sensor can obtain a signal with a higher signal-to-noise ratio. Furthermore, an air-containing volume of the first chamber is smaller than that of the third chamber, which helps to increase air damping under the diaphragm, thereby making a smooth frequency response of the diaphragm.

In summary, the vibration sensor disclosed herein includes a circuit board, a pressure-enhancing member, a pressure sensing device, and a metal housing to define the first, second, and third chambers. The metal housing covers the pressure-enhancing member and the pressure sensing device. Under the shielding of the metal housing, the pressure sensing device is more effective against electromagnetic interference (EMI). The circuit board has a sidewall to define a concave recess and the sidewall has a first through hole as a vent between the first chamber and the third chamber. The first chamber is combined with the third chamber to obtain a communicable air volume. When the pressure-enhancing member moves to squeeze the air in the second chamber, the sensitivity of the pressure sensing device will be greatly improved, and the vibration sensor can obtain a signal with a higher signal-to-noise ratio. Furthermore, an air-containing volume of the first chamber is smaller than that of the third chamber, which helps to increase air damping below the diaphragm, thereby making a smooth frequency response of the diaphragm.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A vibration sensor comprising:
    a circuit board having a concave recess;
    a pressure sensing device disposed on the circuit board and defining a first chamber along with the concave recess of the circuit board, wherein the pressure sensing device comprises a support board, a sensor and a pressure-enhancing member, wherein the pressure-enhancing member comprises a diaphragm and a mass, wherein the support board, the sensor and the diaphragm of the pressure-enhancing member collectively define a second chamber; and
    a metal housing disposed on the circuit board and defining a third chamber along with the circuit board, wherein the circuit board has a sidewall which defines the concave recess and has a first through hole, and the first through hole allows the first chamber venting to the third chamber.

2. The vibration sensor of claim 1, wherein the diaphragm covers the concave recess of the circuit board, and the diaphragm and the support board share substantially the same area.

3. The vibration sensor of claim 1, wherein the support board covers the concave recess of the circuit board, and the diaphragm has an area smaller than that of the support board.

4. The vibration sensor of claim 1, wherein the first, second and third chambers are all disposed between the metal housing and the circuit board, and the first chamber has an air-containing volume smaller than that of the third chamber.

5. The vibration sensor of claim 1, wherein the support board has a second through hole aligned with the sensor.

6. The vibration sensor of claim 1, wherein the first through hole has a bent cross-section.

7. The vibration sensor of claim 1, wherein the circuit board has electrodes.

8. A vibration sensor comprising:
    a circuit board having a concave recess;
    a pressure sensing device disposed on the circuit board and defining a first chamber along with the concave recess of the circuit board, wherein the pressure sensing device comprises a support board, a sensor and a pressure-enhancing member, wherein the pressure-enhancing member comprises a diaphragm and a mass, wherein the support board, the sensor and the diaphragm of the pressure-enhancing member collectively define a second chamber; and
    a metal housing disposed on the diaphragm of the pressure-enhancing member and defining a third chamber along with the diaphragm, wherein the circuit board has a sidewall which defines the concave recess and has a first through hole, and the first through hole allows the first chamber venting to the third chamber.

9. The vibration sensor of claim 8, wherein the diaphragm is disposed on the sidewall and covers the concave recess of the circuit board.

10. The vibration sensor of claim 9, wherein the metal housing has a bottom in contact with the diaphragm, and the diaphragm has an area greater than that of the support board.

11. The vibration sensor of claim 9, wherein the first through hole further goes through the diaphragm.

12. The vibration sensor of claim 8, wherein the first, second and third chambers are all disposed between the metal housing and the circuit board, and the first chamber has an air-containing volume smaller than that of the third chamber.

13. The vibration sensor of claim 8, wherein the support board has a second through hole aligned with the sensor.

14. The vibration sensor of claim 8, wherein the first through hole has a bent cross-section.

15. The vibration sensor of claim 8, wherein the circuit board has electrodes.

* * * * *